(12) United States Patent
Fuller et al.

(10) Patent No.: US 7,502,221 B2
(45) Date of Patent: Mar. 10, 2009

(54) MULTIPLE-USE AUXILIARY DISPLAY

(75) Inventors: Andrew J Fuller, Redmond, WA (US); Niels van Dongen, Seattle, WA (US); Michael George Lenahan, Walnut Creek, CA (US)

(73) Assignee: Microsoft Corporation, Redmond, WA (US)

( * ) Notice: Subject to any disclaimer, the term of this patent is extended or adjusted under 35 U.S.C. 154(b) by 373 days.

(21) Appl. No.: 11/366,760

(22) Filed: Mar. 2, 2006

(65) Prior Publication Data

US 2006/0250320 A1    Nov. 9, 2006

Related U.S. Application Data

(60) Provisional application No. 60/674,204, filed on Apr. 22, 2005, provisional application No. 60/674,203, filed on Apr. 22, 2005.

(51) Int. Cl.
*G06F 1/16* (2006.01)
(52) U.S. Cl. ...................................................... 361/683
(58) Field of Classification Search ................. 361/681, 361/683, 686
See application file for complete search history.

(56) References Cited

U.S. PATENT DOCUMENTS

| 5,224,060 | A | * | 6/1993 | Ma | 361/681 |
|---|---|---|---|---|---|
| 5,268,817 | A | * | 12/1993 | Miyagawa et al. | 361/681 |
| 5,337,212 | A | * | 8/1994 | Bartlett et al. | 361/681 |
| 6,073,187 | A | * | 6/2000 | Jacobs et al. | 361/681 |
| 6,116,767 | A | * | 9/2000 | Chaiken et al. | 710/15 |
| 6,205,021 | B1 | * | 3/2001 | Klein et al. | 361/681 |
| 6,392,871 | B1 | * | 5/2002 | Yanase | 361/681 |
| 6,504,706 | B2 | * | 1/2003 | Stewart | 361/681 |
| 6,538,880 | B1 | * | 3/2003 | Kamijo et al. | 361/686 |
| 6,621,691 | B2 | * | 9/2003 | Howell | 361/681 |
| 6,654,234 | B2 | * | 11/2003 | Landry et al. | 361/681 |
| 6,697,032 | B2 | * | 2/2004 | Chitturi et al. | 361/681 |
| 6,788,530 | B2 | * | 9/2004 | Hill et al. | 361/683 |
| 6,798,647 | B2 | * | 9/2004 | Dickie | 361/683 |
| 6,873,521 | B2 | * | 3/2005 | Landry et al. | 361/681 |
| 7,016,183 | B2 | * | 3/2006 | Takemoto et al. | 361/683 |
| 7,068,499 | B2 | * | 6/2006 | Aisenberg | 361/683 |
| 7,231,529 | B2 | * | 6/2007 | Park | 361/686 |
| 7,254,015 | B2 | * | 8/2007 | Yin et al. | 361/681 |
| 7,271,997 | B2 | * | 9/2007 | Kee et al. | 361/681 |
| 2002/0071246 | A1 | * | 6/2002 | Stewart | 361/681 |
| 2002/0140627 | A1 | * | 10/2002 | Ohki et al. | 345/1.1 |
| 2003/0011975 | A1 | * | 1/2003 | Howell | 361/683 |

FOREIGN PATENT DOCUMENTS

JP          06035567 A  *  2/1994

* cited by examiner

*Primary Examiner*—Anatoly Vortman
*Assistant Examiner*—Adrian S Wilson
(74) *Attorney, Agent, or Firm*—Workman Nydegger (57) ABSTRACT

Described is a technology by which an auxiliary computing device comprising a display and/or actuator set coupled to a host computer system may be interacted with (e.g., viewed) independent of whether a main display of the host computer system is visible, e.g., whether a laptop lid or tablet lid is open or closed. In one example implementation, the auxiliary device is located above the keyboard and the main display slightly elevated on one or more pivoting supports. This effectively provides an opening in the lid through which the auxiliary device may be viewed.

17 Claims, 7 Drawing Sheets

MULTIPLE-USE AUXILIARY DISPLAY

CROSS REFERENCE TO RELATED APPLICATIONS

The present invention claims priority to U.S. provisional patent applications Ser. Nos. 60/674,204 and 60/674,203, herein incorporated by reference.

BACKGROUND

The concept of auxiliary processing and auxiliary mechanisms that provide some auxiliary computing functionality to a main (host) computer system are generally described in a number of U.S. patent applications assigned to the assignee of the present invention, including Ser. Nos. 10/429,930 and 10/429,932. In general, many of these auxiliary computing concepts are embodied in various types of auxiliary displays. Auxiliary displays can show data of a host personal computer, even when the host computer system (e.g., a personal computer) is off or in some other reduced-power state.

One standard design for an auxiliary display in a laptop computer is to have it embedded in the lid, with its own dedicated set of actuators for navigating the auxiliary display user interface. While this provides value, with such a design the auxiliary display is only visible when the laptop lid is closed, negating any value it could otherwise provide when the host computer system is running and the lid is open with the host display screen visible.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which an auxiliary computing device comprising a display and/or actuator set coupled to a host computer system may be interacted with (e.g., viewed) independent of whether the display is visible, e.g., whether a laptop lid or tablet lid is open or closed. In one example implementation, the auxiliary device is located above the keyboard and the main display slightly elevated on one or more pivoting supports. This effectively provides an opening in the lid through which the auxiliary device may be viewed.

Other openings/transparencies in the lid, whether real or simulated, may be provided as a means of allowing viewing of an auxiliary display independent of the lid position.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
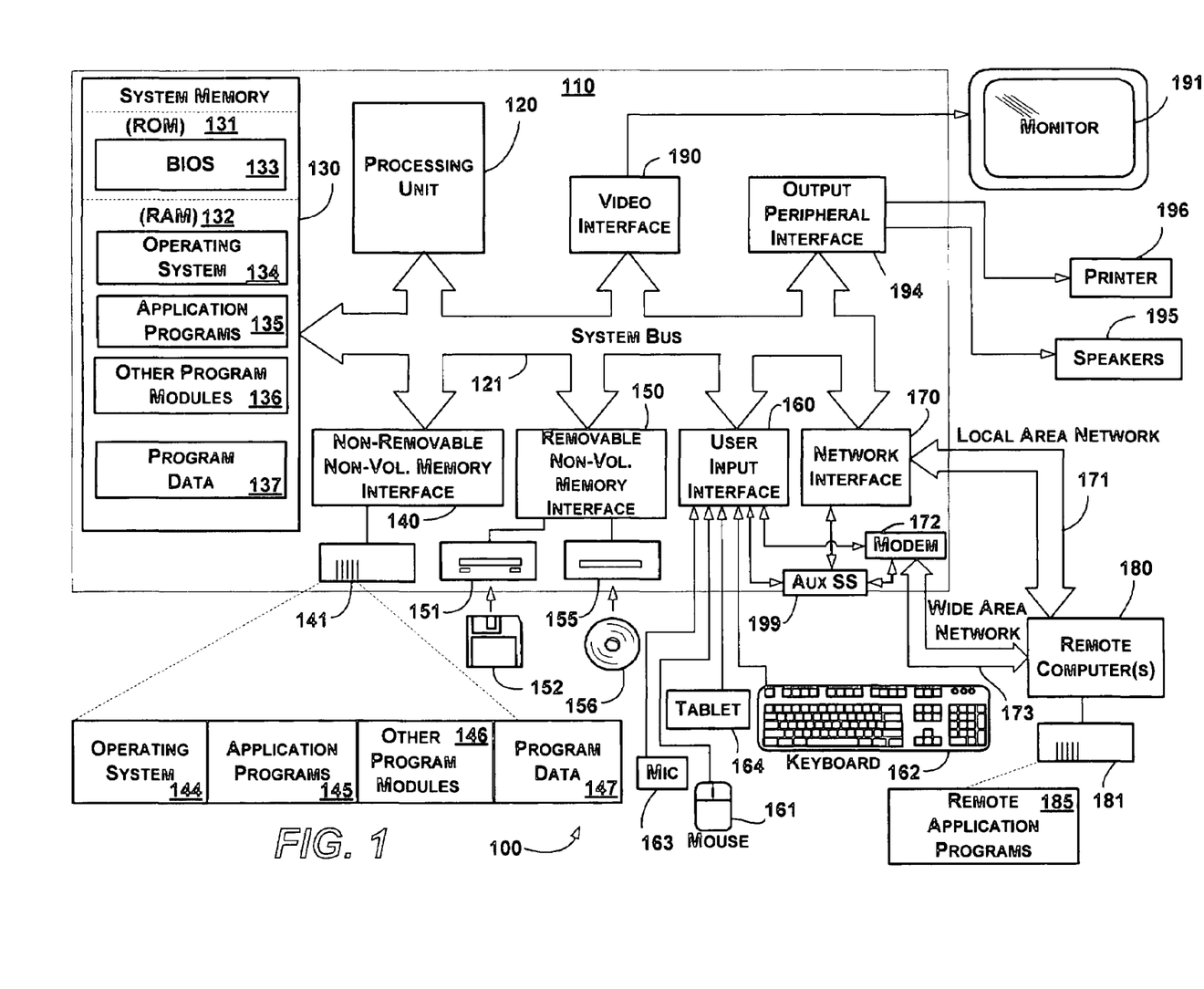
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It may be appreciated that the network connections shown are exemplary and other means of establishing a communications link between the computers may be used.

An auxiliary display subsystem 199 may be connected via the user interface 160 to allow data such as program content, system status and event notifications to be provided to the user, even if the main portions of the computer system are in a low power state. The auxiliary display subsystem 199 may be connected to the modem 172 and/or network interface 170 to allow communication between these systems while the main processing unit 120 is in a low power state. Note that an auxiliary device may be made useful for whatever operating modes a device may have, including modes that can be created by adding an auxiliary device.

Multiple-Use Auxiliary Display

Various aspects of the technology described herein are directed towards an auxiliary display device that remains usable in various host computer configuration states, and/or creates/transforms a formerly unusable or hardly unusable state into a usable state. For example, given a host computer system in the form of a laptop with an integrated auxiliary display, the auxiliary display may remain visible when the laptop lid is open or closed. In general, much of the description herein is directed towards such particular examples. However, numerous other types of configurations and arrangements are feasible. For example, a user may manually position a moveable auxiliary device so as to be able to use the device regardless of the host computer configuration state.

Moreover, while an auxiliary display device may be of the type that is coupled to a host computer system by being physically built into the housing, e.g., in a laptop, other types of auxiliary devices and actuators may similarly leverage the technology described herein, including devices not conventionally thought of as being "computer-system" peripherals. Such devices include television sets, audio receivers, audio/video recorders, telephones, a separate computer, a mobile communications device, a secondary display screen with actuators, a watch, a wall (e.g., kitchen) display, a display screen, a digital picture frame, a clock, a radio, a media player, a device embedded within or using the main display of a consumer electronics device, automotive, transportation or other vehicular units, keyboards or other input devices of the main computer system, a pager, a personal digital assistant, and so forth. As such, the present invention is not limited to the examples, structures or functionality described herein; rather, any of the examples, structures or functionality described herein are non-limiting, and the present invention may be used various ways that provide benefits and advantages in computing and auxiliary device usage in general.

Figure 2:
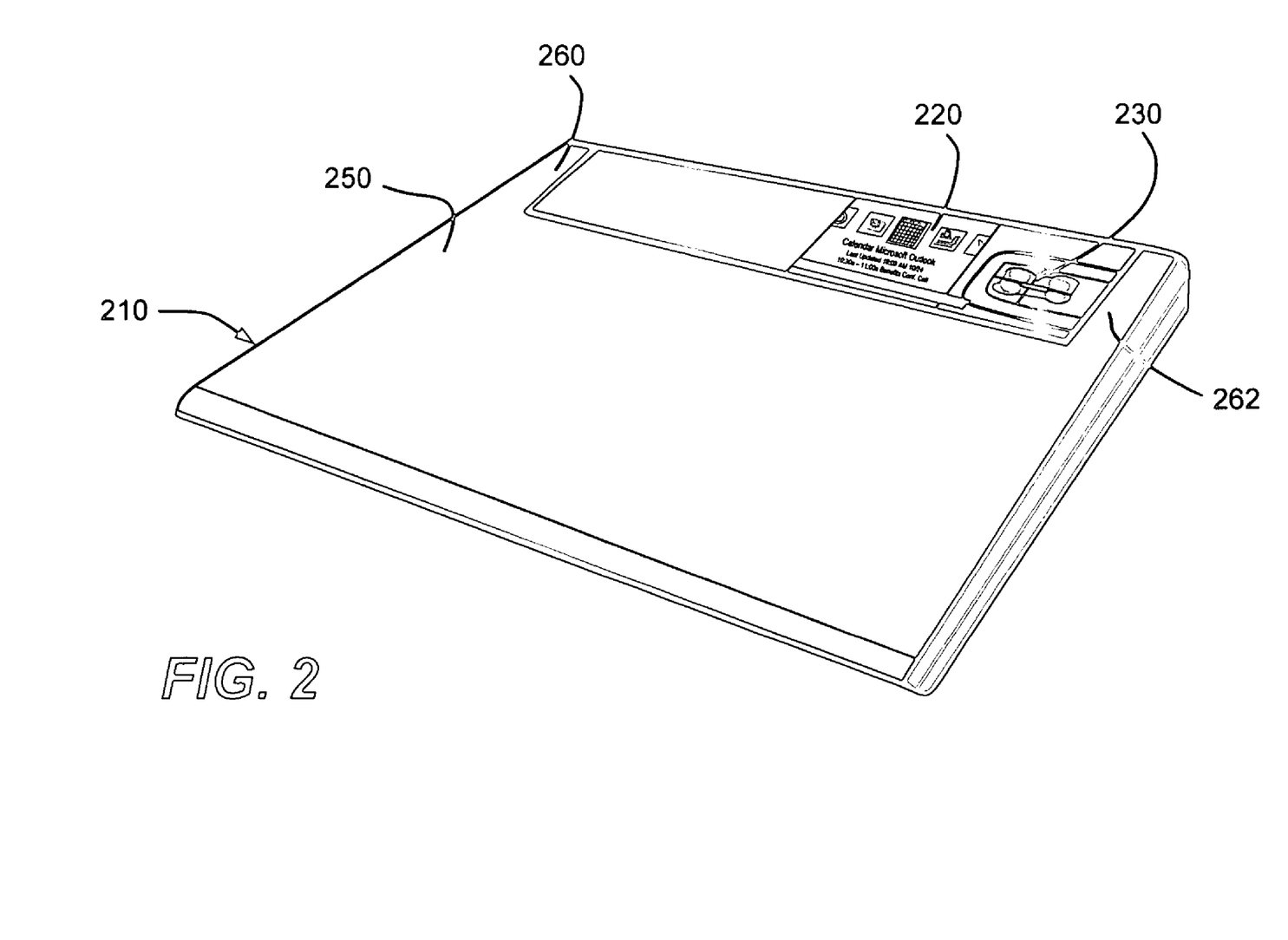
FIG. 2 is a representation of a laptop host computer system having an auxiliary device that provides user interaction when the laptop lid is closed.
Figure 3:
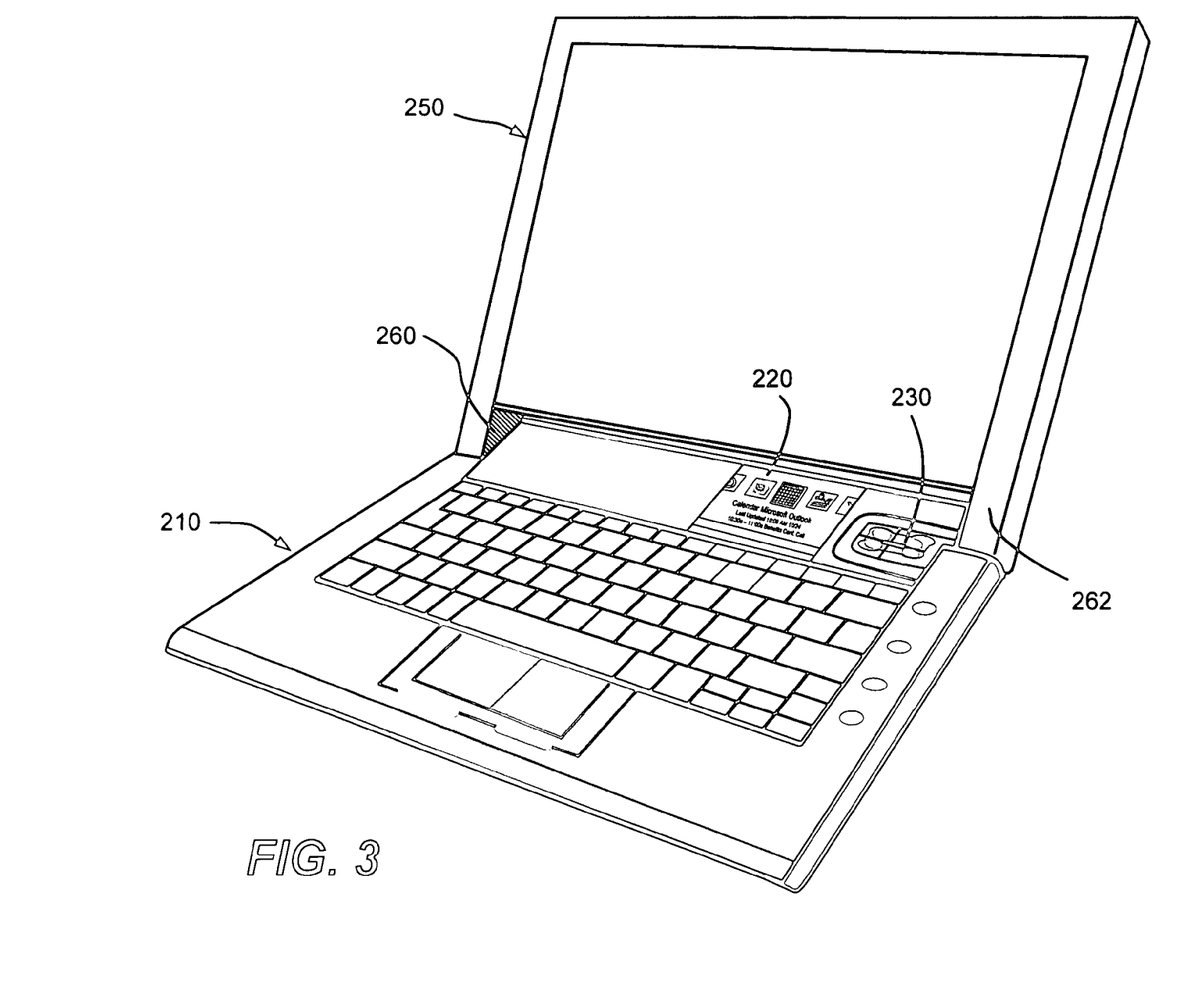
FIG. 3 is a representation of the laptop host computer system of FIG. 2 arranged such that the auxiliary device continues to facilitate user interaction when the laptop lid is open.

Turning to a first, laptop-based example, FIGS. 2 and 3 exemplify a laptop computer 210 configuration having an auxiliary device comprising a display component 220 and actuator component 230 that may be interacted with when the laptop lid 250 is closed (FIG. 2) and open (FIG. 3), thereby enabling dual usage of the auxiliary display. Note that the functionality of the auxiliary display may change in response to such state changes, and also may change according to user control, however the auxiliary device continues to provide functionality regardless of the open or closed lid position.

In the example implementation of FIGS. 2 and 3, multiple auxiliary display usage is accomplished by elevating the main display in the lid open position via supports 260 and 262. Essentially this forms an opening in the lid that allows the auxiliary device to remain visible through the opening whether the lid is open or closed.

Note that more sophisticated mechanisms are feasible, e.g., an alternative design may be provided in which the host computer system's main display can move forward and back, up and down, and/or rotate (as on tablet-based designs) to give the user more flexibility in how the host computer system may be configured for a given usage model. For example, if currently not interested in auxiliary device interaction, the user may slide the main display forward, whereby the host computer system resembles a conventional laptop computer; when desired, the user may later slide back the main display to view and otherwise interact with the auxiliary device.

Moreover, the surface on which the auxiliary device (e.g., display component and actuator set) is located also may move, such as downward so as to be generally on the same plane as the keyboard when the lid is open, and upward so to as to be generally on the same plane as the top of lid when the lid is closed. For example, in one implementation, the part of a computer system in which that the auxiliary display and actuators are integrated tilts towards the user when the lid is opened so that the viewing angle approximates that of the main display, making it easier to view any auxiliary display content.

As mentioned above, the auxiliary device's functionality and/or data being displayed may change in response to state changes, such as the state of the lid position. For example, when open, the auxiliary display 220 may show media-related data and instant-messaging messages, instead of, or in addition to, showing those on the main display, but not when the lid is closed, instead showing only calendar data in such a state. Any such changes may be user configurable.

The orientation of the auxiliary device's user interface components (e.g., the display and actuator set) of the auxiliary device may also change based on the current state. For example, the rotation state of the main display of a convertible tablet-based computer may be detected and used to change the orientation of the auxiliary device, e.g., the display inverts its image and the actuator set such as a D-pad correspondingly reverses its up button to down, left button to right and vice versa. Note that in such a model, the same auxiliary actuator set may be used when open or closed.

Still further, another type of physical rotation may correspond to the screen rotated flat or nearly flat, such as to use a tablet-based computer in slate (tablet writing) mode. The auxiliary display device may vary its position and display accordingly. Another type of rotation corresponds to orientation, that is, landscape or portrait orientation. Again, the auxiliary display device may vary its position and display, e.g., when the tablet is used in a portrait mode the auxiliary display could also switch to portrait when appropriate, such as based on user preferences.

Other state data may include whether the main computer system is in a screen saver or display-power-down mode, and/or what program is currently being run. For example, the auxiliary display device may behave differently when a presentation program is being run, so that the user can position the main display screen to face towards viewers, and operate the presentation program from behind the host computer system by using the auxiliary device with an inverted display and reversed actuator set.

Figure 4:
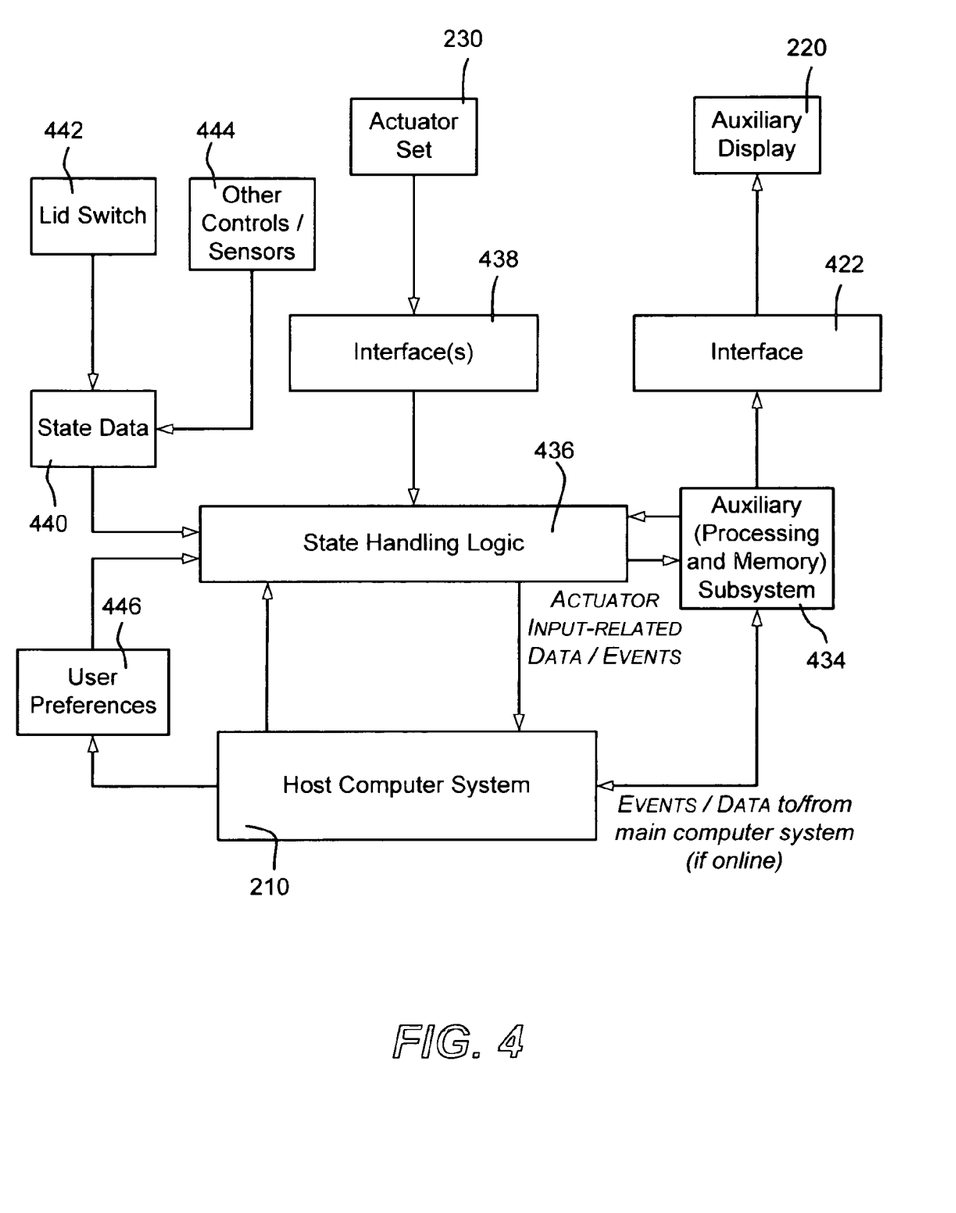
FIG. 4 is a block diagram generally representing components for handling auxiliary data.

FIG. 4 is a block diagram representing some example components that may be used to implement various aspects of the present invention. As represented in the example of FIG. 4, an auxiliary display 220 couples via an interface 422 to an auxiliary subsystem 434, generally comprising processing and memory components. In general, the auxiliary subsystem 434 allows the auxiliary display 220 to operate while the main host computer system 210 is offline, and may also communicate with the main host computer system 210 while online.

In general, in FIG. 4, state data 440 such as based on the state of a lid switch 442 is provided to state handling logic 436, which, for example may be in the auxiliary processing components so that the logic operates even when the host computer system 210 is in an offline state. User preference data 446 or defaults, again possibly cached in an auxiliary storage for offline operation, may be used by the state handling logic 436 to determine what actions to take based on the current state data 440.

If the state handling logic 436 is in the auxiliary system, the state handling logic may provide events to the host computer system 210 when online, and receive data (e.g., instructions) from the host computer system 210, such as to override default behavior. When the host computer system 210 is offline, the state handling logic 436 can still operate, such as to change the orientation of the auxiliary display 220 based on the current lid position. Another event may come from a sensor that detects how the user is holding the machine, e.g., a mercury-type switch sensor.

As also represented in FIG. 4, the actuator set 230 may be coupled to state handling logic 436 via one or more suitable interfaces (e.g., a driver) 438. When the host computer system 210 is online, the state handling logic 436 can communicate (e.g., via events) with the host computer system 210, primarily to provide information corresponding to actuator input data to the host computer system 210, such as to its operating system. Note that alternatively, actuator input-related data may be fed to the host computer system 210 through the auxiliary subsystem 434, which is generally already configured to provide events to the host computer system 210.

When online, the host computer system 210 can send data (e.g., configured as pages or the like) to the auxiliary subsystem 434 for rendering on the auxiliary display 220. In this manner, the host computer system 210 can control the output of the auxiliary display 220 in response to events received, including events that correspond to interaction with the actuator set 230. Note that the host computer system 210 also may control the output of the auxiliary display 220 in response to other events and other user input, e.g., conventional keyboard and mouse input, received emails, calendar events, phone (caller-ID) events, and so forth.

When online, the host computer system 210 can also instruct the state handling logic 436 to be used to control the operation of the auxiliary display 220 independent of the host computer system 210, e.g., as if the host computer system 210 was offline, until otherwise instructed. Other state data 440 can also be used for this purpose, e.g., the lid switch 442 can provide its state, as well as other controls and sensors 444, such as one that indicates whether a tablet PC screen is in a rotated state, and so forth. Note that the state data 440 may include information as to whether the host computer system 210 is in a screen saver or display-power-down mode, (which may be considered a form of being offline), and/or what program is currently being run; for example, the auxiliary display subsystem 434 may behave differently when a presentation program is being run with respect to when another program is run. Still other possible state data includes proximity sensing, time-of-day, whether a phone call is detected, whether the host computer system is operating, when there is a connection to another device and/or a network, and so forth.

User preferences 446, e.g., comprising rules, defaults, and/or other information, also may be a factor in determining operation of the auxiliary device, including whether and how to route input from the actuator set 230. Such preference data 446 or a subset thereof may be configured or overridden by the host computer system 210 when online, and may be maintained in the auxiliary processing and memory subsystem 434 so that it is available for offline use. Essentially any piece or combination of state data 440, and user preferences/overrides 446 can be used to determine whether the host computer system 210 or the auxiliary processing and memory subsystem 434 controls what content is displayed, and how the auxiliary handling logic 436 operates to route actuator set input.

When the host computer system is offline, or otherwise acts as such with respect to input from the actuator set 230, the auxiliary subsystem 434 directly controls the content displayed on the auxiliary display 220. This may be accomplished in various ways, such as by having the state handling logic 436 provide interaction (navigation) events to an auxiliary program (e.g., operating system) running on the auxiliary subsystem 434 (instead of to the main computer system 210, or to both, with the main computer system simply not handling the events). Note that the auxiliary subsystem 434 is available for use because offline content may cached in an auxiliary memory, and because the auxiliary processor, memory and state handling logic 436 have power maintained thereto, whereby the state handling logic 436 has the ability to generate events to a running auxiliary program even when the host computer system 210 is powered down to some extent As can be readily appreciated, other various state data 440 as evaluated against user preferences 446 or the like may control or override operation, e.g., a system may be configured to not use the auxiliary display 220 when power is critically low.

As can be readily appreciated, various ways to handle input data may be alternatively implemented. For example, instead of actuator handling logic 436, the actuator set 230 can be coupled (via one or more interfaces) to both the host computer system 210 and to the auxiliary subsystem 434. When the host computer system 210 is online, the auxiliary processing subsystem 434 can ignore user interaction events received from the actuator set 230, essentially deferring to the host computer system 210, which can route them back as desired. When offline, the auxiliary processing subsystem 434 accepts the user interaction events and operates based on them, with the host computer system 210 not being operational to handle such events, thereby precluding conflicts.

Figure 5:
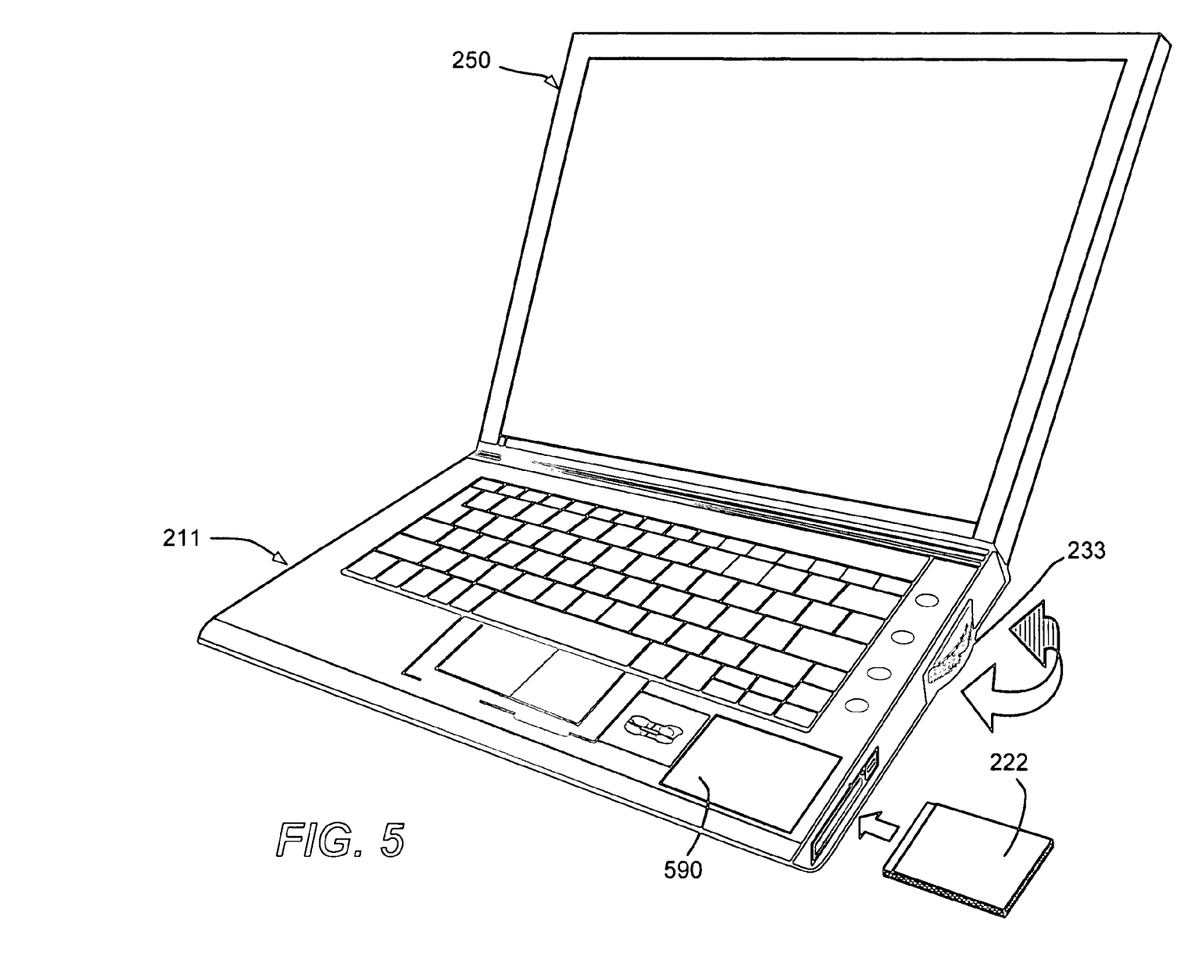
FIGS. 5-7 are various representations of a laptop host computer system having an auxiliary device that plugs in to provide user interaction when the laptop lid is open or closed.
Figure 6:
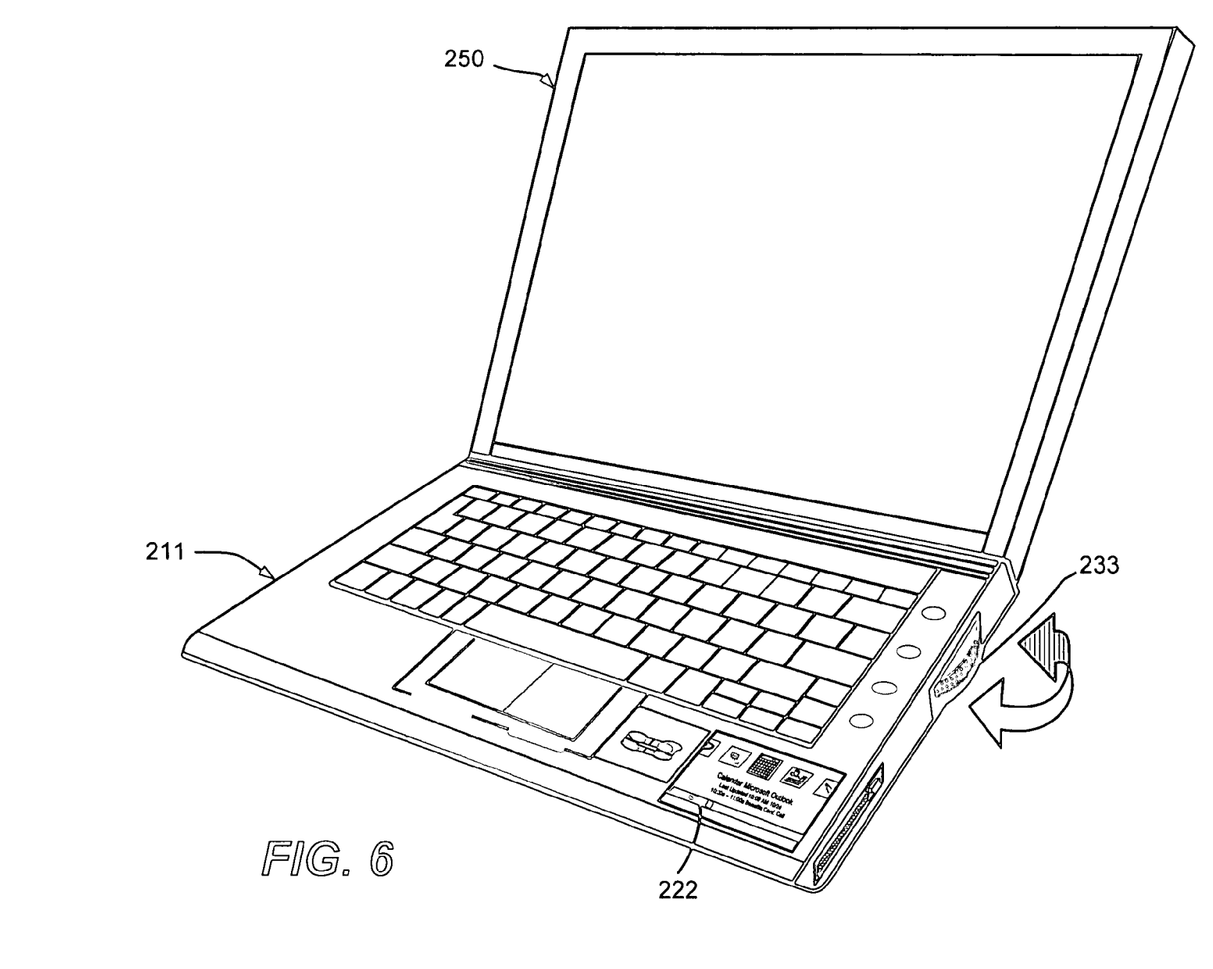
Figure 7:
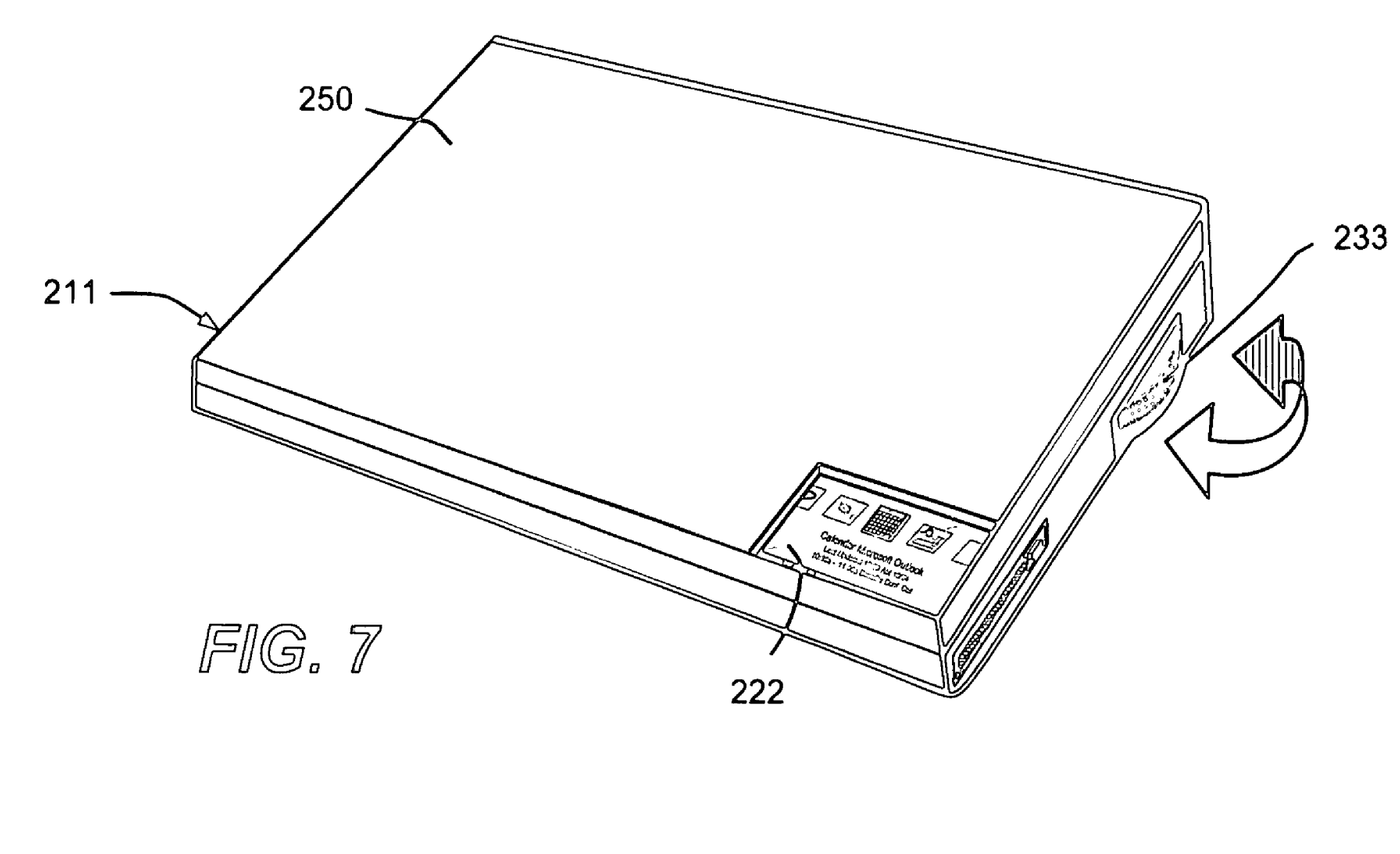

FIGS. 5-7 exemplify another type of auxiliary device model (in a laptop or tablet-based computer design 211) that may be viewed independent of the position of its lid 250, and in which an actuator set 233 remains accessible independent of the lid position. In this example, the actuator set 233 is in the form of a jog-dial control; (the curved arrow to the right of the arrow jog dial control is to indicate its primary directions of movement, and is of course not part of the system). The actuator set is on the side, and is thus accessible when the lid is open or closed.

In FIGS. 5-7, the exemplified auxiliary device comprises a detachable auxiliary display, e.g., implemented in the form of a detachable card 223, such as a PCMCIA card or the like that shows through a transparent surface 590 (FIG. 5) when inserted (FIGS. 6 and 7). However, it is understood that other auxiliary devices such as a wired (e.g., wired USB-based) or wireless auxiliary display are equivalent. Thus, it is readily apparent that a user can, for example, manually couple (e.g., clip-on) an auxiliary display device to a host computer system and interact with the auxiliary device to some extent, for any one of the various states that the host computer system may be in at any given time.

Note that it is feasible for the auxiliary display 222 (or a secondary device) to remain visible when the laptop lid is closed, as in FIG. 7. This may be accomplished in any number of ways, including by having a smaller main display screen, by using part of the main display screen as the auxiliary display and viewing it from the other side, by having a transparent LCD-based main display (at least in part) that can be viewed through, by projecting the display to a surface on the lid 250, by having a secondary auxiliary display panel in the lid, and so forth. As can be readily appreciated, any of these concepts as well as others provide an actual or simulated opening/transparency through which an auxiliary display or simulation thereof may be viewed. Moreover, because the actuator set 233 is on the side, input to navigate the auxiliary-displayed content may be received while the lid is closed as in FIG. 7.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A portable computer system comprising:
   a keyboard portion;

a lid that is connected to the keyboard portion by at least one pivot support and such that the lid is enabled to pivot between an open position and a closed position with respect to the keyboard portion;

a main display integrated into the lid;

an auxiliary display attached to the keyboard portion;

wherein the main display and the auxiliary display operate independently, the auxiliary display being attached to the keyboard portion of the portable computer system in such a way as to be visible from an unchanged viewing perspective irrespective of whether the lid is in the open position or the closed position;

the portable computer system being configured to display content at the auxiliary display dependent upon a detected state of the portable computer system and to responsively change the content that is displayed at the auxiliary display based on one or more detected changes in one or more of a plurality of different states of the portable computer system and user configurable preferences that indicate which changes in the one or more different states of the portable computer system will cause the auxiliary display to responsively change the content that is displayed in response to the one or more detected changes, wherein the plurality of the different states include one or more of a state of a screen saver mode, a state of a display-power-down mode, a state of reduced power consumption mode, a state of operating, a state of a presentation mode, a state of a received phone call, a state of proximity sensing, a state of time-of-day, a state of a connection to another device or a network, a physical state of the lid being opened or closed, a state of physical and rotational orientation of the main display, and a state of a sensor detecting a change in physical position or orientation of the portable computer system; and wherein the auxiliary display is attached to and readily detached from the portable computing system such that the lid covers the auxiliary display when the lid is closed, and further comprising at least one actual and/or simulated transparent area in the lid of the portable computing system though which the auxiliary display may be viewed when the lid is in the closed position.

2. The portable computer system of claim 1, wherein the one or more different states comprises the state of the screen saver mode and wherein the user configurable preferences indicate that a change in the state of the screen saver mode will cause the auxiliary display to responsively change the content that is displayed at the auxiliary display.

3. The portable computer system of claim 1, wherein the one or more different states comprises the state of the display-power-down mode and wherein the user configurable preferences indicate that a change in the state of the display-power-down mode will cause the auxiliary display to responsively change the content that is displayed at the auxiliary display.

4. The portable computer system of claim 1, wherein the one or more different states comprises the state of reduced power consumption mode and wherein the user configurable preferences indicate that a change in the state of reduced power consumption mode will cause the auxiliary display to responsively change the content that is displayed at the auxiliary display.

5. The portable computer system of claim 1, wherein the one or more different states comprises the state of operating and wherein the user configurable preferences indicate that a change in the state of whether the portable computer system is operating will cause the auxiliary display to responsively change the content that is displayed at the auxiliary display.

6. The portable computer system of claim 1, wherein the one or more different states comprises the state of presentation mode and wherein the user configurable preferences indicate that a change in the state of the presentation mode will cause the auxiliary display to responsively change the content that is displayed at the auxiliary display.

7. The portable computer system of claim 1, wherein the one or more different states comprises the state of the received phone call and wherein the user configurable preferences indicate that a change in the state of the received phone call will cause the auxiliary display to responsively change the content that is displayed at the auxiliary display.

8. The portable computer system of claim 1, wherein the one or more different states comprises the state of proximity sensing and wherein the user configurable preferences indicate that a change in the state of proximity sensing will cause the auxiliary display to responsively change the content that is displayed at the auxiliary display.

9. The portable computer system of claim 1, wherein the one or more different states comprises the state of the time-of-day and wherein the user configurable preferences indicate that a change in the state of the time-of-day will cause the auxiliary display to responsively change the content that is displayed at the auxiliary display.

10. The portable computer system of claim 1, wherein the one or more different states comprises the state of the connection to another device or a network and wherein the user configurable preferences indicate that a change in the state of the connection to another device or a network will cause the auxiliary display to responsively change the content that is displayed at the auxiliary display.

11. The portable computer system of claim 1, wherein the one or more different states comprises the physical state of the lid being opened or closed and wherein the user configurable preferences indicate that a change in the physical state of the lid being opened or closed will cause the auxiliary display to responsively change the content that is displayed at the auxiliary display.

12. The portable computer system of claim 1, wherein the one or more different states comprises the state of the physical and rotational orientation of the main display and wherein the user configurable preferences indicate that a change in the state of the physical and rotational orientation of the main display will cause the auxiliary display to responsively change the content that is displayed at the auxiliary display.

13. The portable computer system of claim 1, wherein the one or more different states comprises the state of the sensor detecting the physical position or orientation of the portable computer system and wherein the user configurable preferences indicate that a change in the state of the sensor detecting the physical position or orientation of the portable computer system will cause the auxiliary display to responsively change the content that is displayed at the auxiliary display.

14. The portable computer system of claim 1 further comprising an actuator set that is user accessible whether the lid is open or closed.

15. The portable computer system of claim 14 wherein the actuator set is located on the side of the computing device so as to be user accessible whether the lid is open or closed.

16. The portable computer system of claim 1 wherein the computing device comprises a laptop computer.

17. The portable computer system of claim 1 wherein the computing device comprises a tablet-based computer.

* * * * *